United States Patent
Schmidt et al.

(10) Patent No.: US 8,509,927 B2
(45) Date of Patent: Aug. 13, 2013

(54) CONTROL SYSTEM FOR CONTROLLING SAFETY-CRITICAL PROCESSES

(75) Inventors: Joachim Schmidt, Bad Pyrmont (DE); Steffen Horn, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 279 days.

(21) Appl. No.: 12/878,442

(22) Filed: Sep. 9, 2010

(65) Prior Publication Data

US 2011/0071654 A1 Mar. 24, 2011

(30) Foreign Application Priority Data

Sep. 23, 2009 (DE) .......................... 10 2009 042 368

(51) Int. Cl.
*G05B 9/02* (2006.01)

(52) U.S. Cl.
USPC .................. 700/79; 700/21; 700/108; 700/2; 700/4; 700/81

(58) Field of Classification Search
None
See application file for complete search history.

(56) References Cited

U.S. PATENT DOCUMENTS

| 5,784,547 | A  | * | 7/1998  | Dittmar et al. ................. 714/4.5 |
|-----------|----|---|---------|----------------------------------------|
| 5,957,985 | A  |   | 9/1999  | Wong et al. |
| 6,205,483 | B1 | * | 3/2001  | Nakanishi ..................... 709/229 |
| 6,347,252 | B1 | * | 2/2002  | Behr et al. ........................ 700/3 |
| 6,532,508 | B2 | * | 3/2003  | Heckel et al. ................. 710/110 |
| 6,549,034 | B1 | * | 4/2003  | Pietrzyk et al. ................ 326/38 |
| 6,611,722 | B2 | * | 8/2003  | Behr et al. ........................ 700/3 |
| 6,832,343 | B2 | * | 12/2004 | Rupp et al. .................... 714/47.1 |
| 6,853,292 | B1 | * | 2/2005  | Kramer et al. .............. 340/3.43 |
| 6,957,115 | B1 | * | 10/2005 | Meyer-Grafe et al. ....... 700/108 |
| 6,999,824 | B2 | * | 2/2006  | Glanzer et al. ................... 700/18 |
| 7,269,465 | B2 | * | 9/2007  | Esch et al. ....................... 700/21 |
| 7,337,028 | B2 | * | 2/2008  | Kalhoff ............................ 700/95 |
| 7,636,606 | B2 | * | 12/2009 | Dold et al. ....................... 700/79 |
| 7,660,915 | B2 | * | 2/2010  | Apel et al. ...................... 710/18 |

(Continued)

FOREIGN PATENT DOCUMENTS

| DE | 10353950 A1 | 6/2005 |
| EP | 2 161 638 A1 | 3/2010 |

OTHER PUBLICATIONS

Dipl-Ing. Hauber, "German Office Action for International Application No. 10 2009 042 368.0-31", Apr. 9, 2010, Publisher: German Patent Office, Published in: DE.

(Continued)

*Primary Examiner* — Kavita Padmanabhan
*Assistant Examiner* — Christopher E Everett
(74) *Attorney, Agent, or Firm* — Kaplan Breyer Schwarz & Ottesen, LLP (57) ABSTRACT

The invention relates to a control system for controlling safety-critical processes in an automated system by using a communications network with a communications master for controlling the communications on the network and a plurality of network subscribers. At least a few of the network subscribers are constructed as decentralized, secure network subscribers, and each has a separate, decentralized safety controller for controlling a safety-relevant application. Each of the decentralized, secure network subscribers has a unique safety address. The decentralized, secure network subscribers themselves execute the safety functions and/or safety logic operations relevant to them. The decentralized, secure network subscribers communicate with each other in a fail-safe way in which each executes automatic, fail-safe point-to-point communications with another of the decentralized, secure network subscribers, in order to be able to provide safety functions covering the decentralized, secure network subscribers.

14 Claims, 5 Drawing Sheets

(56) References Cited

U.S. PATENT DOCUMENTS

| | | | |
|---|---|---|---|
| 7,689,301 B2* | 3/2010 | Araki et al. | 700/81 |
| 7,787,966 B2* | 8/2010 | Rotzler et al. | 700/17 |
| 7,945,818 B2* | 5/2011 | Oster et al. | 714/48 |
| 8,010,213 B2* | 8/2011 | Moddemann | 700/79 |
| 2002/0126620 A1 | 9/2002 | Heckel et al. | |
| 2004/0210620 A1* | 10/2004 | Muneta et al. | 709/200 |
| 2006/0142876 A1* | 6/2006 | Kalhoff et al. | 700/11 |
| 2006/0198239 A1 | 9/2006 | Zehentner | |
| 2009/0222107 A1* | 9/2009 | Moddemann et al. | 700/21 |

OTHER PUBLICATIONS

LL Xiao, "Related International Patent Application No: 201010290449.8 Office Action", Apr. 1, 2013, Publisher: CCPIT, Published in: CN.

\* cited by examiner

CONTROL SYSTEM FOR CONTROLLING SAFETY-CRITICAL PROCESSES

CROSS-REFERENCE TO RELATED APPLICATIONS

German patent application DE 10 2009 042 368.0, filed Sep. 23, 2009, is incorporated herein by reference.

FIELD OF THE INVENTION

The invention relates to a control system for controlling safety-critical processes in an automated system by means of a communications network, in particular, by means of a bus system.

BACKGROUND OF THE INVENTION

For reducing risks to humans or the environment, especially in automated systems, safety functions are realized. Simple examples here are shutting down a machine after pressing an emergency-off button or stopping a robot when a person walks into the safety zone of the robot and in this way, e.g., breaks a light barrier or is detected by a light screen monitoring the safety zone of the robot or when a monitored access door opens. In the case of especially safety-critical processes, it could also be necessary to shut down large parts of a complex system or even the entire system if certain safety functions are activated.

For this purpose, fail-safe automation systems are used. In general, on one hand, fail-safe automation systems realize the actual safety function, such as, e.g., emergency-off switching, two-hand switching, operating-mode selection switching, etc.; on the other hand, fail-safe automation systems comprise fault-detecting and fault-correcting measures, e.g., according to mechanisms defined in standards (e.g., according to IEC 61508, ISO 13849, etc.). These mechanisms are known in principle to a person skilled in the art.

In known systems, communication systems that connect decentralized I/O devices and controllers are used depending on the extent of the systems and the degree of automation. For the transport of safety-related data, these networks are supported by secure network protocols. The secure data is here transmitted by means of parallel, secure signal wiring or transmitted in an integrated way by means of the communications system.

In the case of integrated transmission, the signal flow being used typically starts from a central safety technology unit into which the secure input signals are transported to the secure controller, processed there (secure application), and then transported to the corresponding actuators. Errors could now occur, e.g., in the hardware and firmware of the automation devices, in the infrastructure components of the networks (e.g., fieldbuses, Ethernet, etc.), and during the data transmission due to external influences, such as, e.g., EMC interference.

For example, in DE 103 53 950 A1, a control system is described in which the control unit for controlling the safety-critical processes is connected in a fieldbus-independent way, e.g., to a multi-port memory interface of the bus master.

In automation technology, there are currently two trends. On one hand, there is the decentralization of the control function and, on the other hand, there is an integration of safety technology into the control and network technology. In the case of the decentralization of the control function, this is typically moved farther into the output level. Thus, e.g., in drives, the (unsecured) control function is integrated to a limited extent.

With the integration of the safety technology in controllers and networks, strict dependencies are generated in the application process. These dependencies lead to more complex planning and programming of the systems. This stands in undesired contrast to the aspect of simplification of the safety technology with respect to handling in all phases of the life cycle in the automation technology. On one hand, this leads to slow acceptance in the transition of the conventional, hard-wired safety technology on the basis of the safety relay and, on the other hand, to error-prone use and scarce availability of the system due to so-called error triggers of the safety function.

In the sense of the simple handling and modularization capability of fail-safe automation systems, the entire safety function of a system is divided into small, manageable, locally definable, and easily verifiable modules. This corresponds to the approach of persons entrusted today with safety technology in the case of system automation. In addition, in this way, system modifications and system expansions are easily possible, without already verified system parts having to be verified again. In addition, the modularization and separation of the safety function from standard functions corresponds to the requirements of current safety standards.

Another advantage for the user is given in the possibility of constructing the decentralized safety modules in a network-independent and controller-independent way. In this way, they are independent of a specific control provider. This means that they can remain if the standard controller and/or the network must be changed—due to non-safety-relevant requirements of the target market—in the case of the safety technology being used and the verified safety modules.

Despite the possible division and decentralization of locally defined safety functions, however, system-wide safety functions are also to be encountered. Thus, e.g., the triggering of a safety function in a cell should also have effects, such as stopping movements that could cause danger in the adjacent cells.

For guaranteeing such system-wide safety functions, the decentralized safety modules are either coordinated in a fail-safe way by a higher-level central safety controller or have the ability to communicate with each other in a fail-safe way. In contrast to the original goal of simplification, both approaches lead to greater complexity in the network configuration.

SUMMARY OF THE INVENTION

Therefore the invention has the task of providing a control system for controlling safety-critical processes, wherein this system, on one hand, allows two locally defined and system-wide safety functions and, on the other hand, simplifies the network configuration and avoids user errors.

According to the invention, a control system is provided for controlling safety-critical processes in an automated system by means of a communications network with, in particular, an unsecured communications master for controlling unsecured communications on the network and a plurality of network subscribers. Of the network subscribers, at least a few comprise so-called safety data input objects (SDI objects) and/or safety data output objects (SDO objects). SDI objects (Safety Data Input) comprise, e.g., sensors, and SDO objects (Safety Data Output) comprise, e.g., actuators.

At least a few of the network subscribers are now constructed as decentralized, secure network subscribers, and each comprises a separate, decentralized safety controller, e.g., in the form of a secure logic module, for controlling a safety-relevant application, and each has a unique safety address. The decentralized network subscribers themselves execute the safety functions and/or safety logic operations relevant for them and communicate with each other in a fail-safe way in that they each execute automatic, fail-safe point-to-point communications with the subsequent decentralized secure network subscribers. In this way, in particular, system-wide safety functions covering the decentralized, secure network functions can already be provided, without a central safety controller being required.

The decentralized, secure network subscribers are thus, to a certain extent, selected network subscribers containing decentralized safety components that form a logical software busbar with defined data width through the automatic, fail-safe point-to-point communications with each of their followers. The decentralized safety components or the decentralized safety controllers are, e.g., secure logic modules. By means of these modules, system-wide, fail-safe communications between the decentralized, secure network subscribers are established automatically. Each decentralized, secure network subscriber has a unique safety address that is used as the respective source and target addresses for the automatic establishment of the linking within the point-to-point relationships. For this purpose, in particular, no network configuration tool is required. The user can configure the software busbar or the fail-safe point-to-point communications, e.g., exclusively by setting the safety addresses of these safety components. The unique safety address can be fixed, e.g., by means of a DIP switch and/or by means of software in the decentralized, secure network subscriber.

According to one special embodiment of the invention, the decentralized, secure network subscribers are linked with allocated (conventional) SDI and/or SDO objects, none of which has a separate, decentralized safety controller for controlling a safety-relevant application, and are grouped with these allocated SDI and SDO objects into safety islands, wherein each safety island comprises at least one decentralized, secure network subscriber to which the allocated SDI and/or SDO objects without separate, decentralized safety controllers are connected as satellites. The decentralized, secure network subscribers or secure logic modules control the intra-island, fail-safe communications and the island-covering, fail-safe communications, in order to provide system-wide safety functions. The decentralized safety components are consequently secure logic modules of a safety-island with additional equipped means for fail-safe cross communications. The decentralized, secure network subscribers themselves can furthermore be constructed as SDI and/or SDO objects with an additional secure logic module. Thus, on one hand, fail-safe communications between the SDI objects and SDO objects for fail-safe control take place within the safety islands and, on the other hand, the entire system can be shut down successively by means of the fail-safe point-to-point communications if a system-wide safety function is encountered.

Thus, for the configuration of the safety logic of the relevant safety island, additional possibilities are provided to the user for forwarding fail-safe signals through the entire system. Different strategies are conceivable here. For example, a separate data line could be provided for each safety island, and each safety island is fixed to exactly one data line allocated to it in the software busbar (exclusive writing permissions) and signals dangerous system states to the other safety islands (only reading permissions) through the level. Likewise, other strategies for the access permissions to the individual signals of the system-wide software busbar are possible, with which, e.g., small sub-rings can be realized.

For the fail-safe point-to-point communications, in particular, a secure communications protocol is used.

The (island)-covering or system-wide, fail-safe communications between the decentralized, secure network subscribers are automatically established without the use of a network configuration tool, as already stated, by means of the fail-safe point-to-point communications. Therefore, a software busbar is discussed that replaces signal lines designed in terms of hardware by means of an automatically established data flow between the secure logic modules or a higher-level safety controller for fail-safe communications. The software busbar represents an automatically generated, secure data flow between intelligent safety modules (logic units, network-capable safety switching devices, safety controllers) with a defined data width. This is realized in the form of a series connection of several secure point-to-point communications relationships. The establishment of these point-to-point relationships connected in series could be realized automatically in the standard network master and without the additional use of a network configuration tool. The software busbar thus allows a simple covering or system-wide secure communications of a plurality of secure network subscribers.

In other words, the decentralized, secure network subscribers of the safety islands communicate with each other in a system-wide, fail-safe way, in particular by means of fail-safe telegram traffic, in order to be able to also provide system-wide safety functions—in addition to the intra-island safety functions. For this purpose, the decentralized, fail-safe logic modules are automatically linked and without a higher-level central safety controller through the mechanism of the logical software busbar. The software busbar method for linking several safety islands (so-called safety islands) can be applied, e.g., in the so-called SafetyBridge system of the applicant starting from Step 2.

The unsecured communications between the network subscribers are controlled by, in particular, the unsecured communications master. The communications network is, in particular, a bus system, e.g., a fieldbus with an unsecured standard bus master, sometimes designated as a K-master. The SDI and/or SDO objects without separate, decentralized safety controllers are likewise network or bus subscribers, so-called K-slaves.

For the automatic formation of the logical software busbar, the fail-safe, decentralized network or bus subscribers thus provide means with whose help, e.g., in a higher-level standard controller or in the higher-level, in particular, unsecured network master or communications master or in other network infrastructure components, an automatic routing of the telegrams can be installed between the fail-safe, decentralized network subscribers.

All of the errors that can be generated by the automatic routing of the telegrams are recognized at the end points by the safety protocol.

The securing of the fail-safe telegram traffic takes place, in particular, exclusively at the fail-safe end points of the communications (so-called black-channel principle). Typical error-detecting measures are time stamping, redundancy, checksums, serial numbers, but also transmitter and receiver identification. This is used primarily to guarantee the uniqueness of the allocation of the source and target of the telegram and to identify "misrouting" within the standard communications network (black channel).

The black-channel principle starts from arbitrary errors, such as the swapping, destruction, falsification of telegrams in the standard network and its infrastructure components.

The error-detecting measures of the fail-safe communications protocol claim no credit for the error-detecting measures likewise provided in the standard networks.

Advantageously, the invention consequently allows an automatic establishment of (island)-covering or system-wide, fail-safe communications between the decentralized, secure network subscribers without the use of a network configuration tool. Furthermore, the application program is simplified by the invention, and user errors are avoided.

BRIEF DESCRIPTION OF THE DRAWINGS

Below, the invention will be explained in detail using embodiments and with reference to the figures.

Shown are.

DETAILED DESCRIPTION

Figure 1:
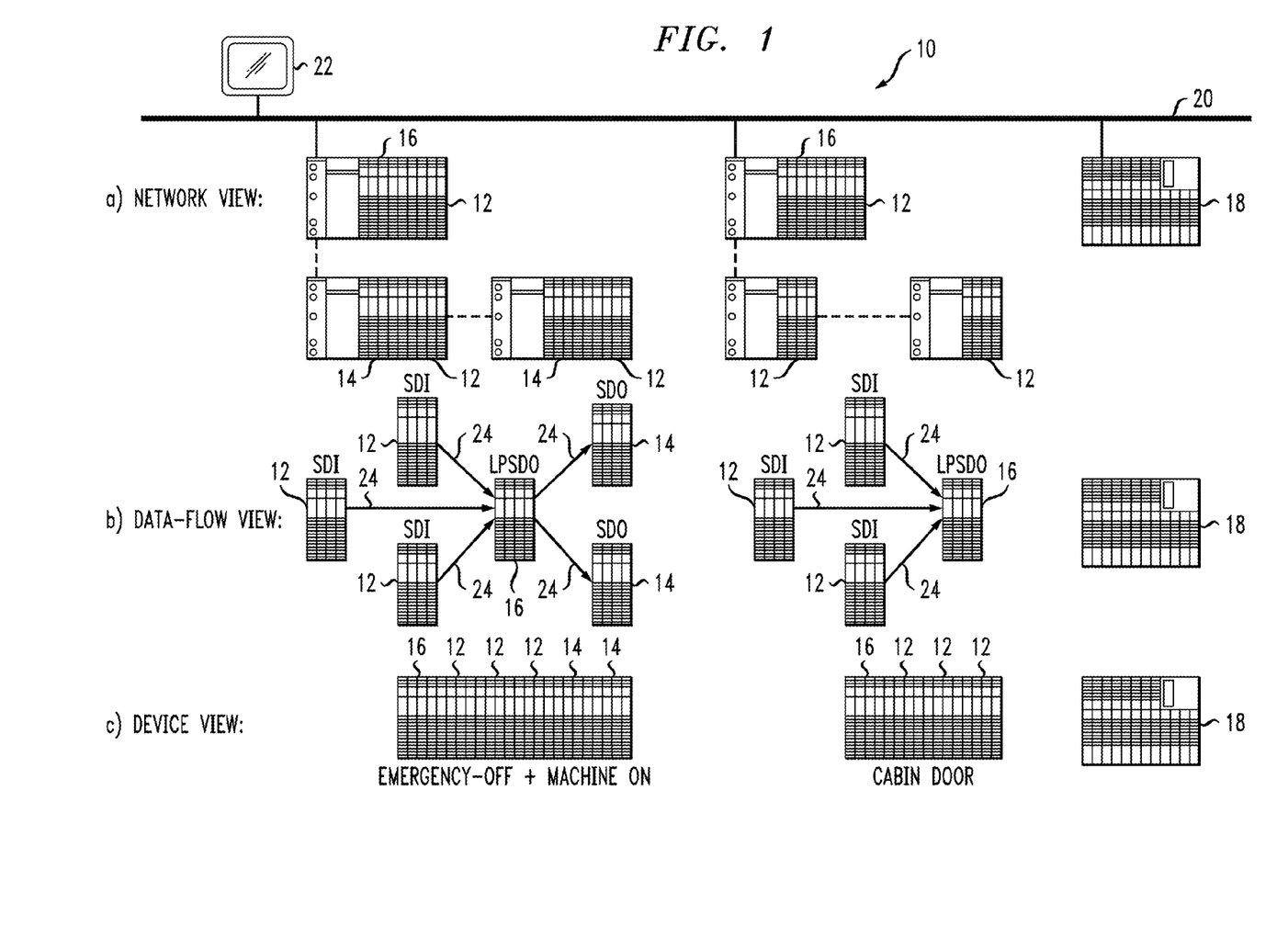
FIG. 1, a schematic diagram of autonomously-operating, independent safety islands, FIG. 2, a schematic diagram of another embodiment with a plurality of safety islands linked in series by a software busbar, FIG. 3, a schematic diagram of the point-to-point relationships within the software busbar from FIG. 2, FIG. 4, a schematic diagram of the internal structure of a decentralized, secure network subscriber LPSDO, and FIG. 5, a schematic diagram of the decentralized, secure network subscriber connected to the software busbar.

With reference to FIG. 1, the arrangement made from autonomously operating, independent safety islands 1, 2 and an optional compact safety small controller 18 is shown.

FIG. 1a) shows the control system 10 for controlling safety-critical processes from the network view. The first safety island 1 comprises three SDI objects 12 and two SDO objects 14, and the second safety island comprises three SDI objects 12, each object lacking a decentralized, secure logic module. The respective numbers of SDI and SDO objects 12, 14 are to be understood as examples.

The SDI objects create a safety-relevant protocol that is processed by a secure logic module 17 (cf. FIGS. 4 and 5) of the decentralized, secure network subscriber LPSDO 16, in order to trigger a safety-relevant function by means of one of the SDO objects 14. The secure logic module 17 that comprises the decentralized, secure network subscriber LPSDO 16 could also be designated as a safety analyzer. The decentralized, secure network subscriber 16 executes the application program and has, in this example, a safety data output module (LPSDO). The decentralized, secure logic modules could also comprise, however, network subscribers with a safety data input module or with a combination SDIO module. The secure logic modules 17 of the decentralized, secure network subscribers 16 carry out the safety functions and possibly disconnect system parts. The safety functions carry out intra-island and/or island-covering safety-relevant functions when needed.

The SDI and SDO objects 12, 14 as well as the decentralized, secure network subscribers 16 are each linked as network subscribers in the network that is controlled by an unsecured network master or communications master 22 (so-called K-master). Furthermore, a safety small controller 18 is also connected to the network. In this example, the network is constructed as a bus system 20, so that the network master is a bus master 22. The unsecured data traffic is consequently controlled by the bus master 22, and the objects 12, 14, 16, 18 are K-slaves. The bus system 20 realizes no safety-relevant tasks, but instead functions only as a transmission medium. In this way, unsecured components could also be connected to the network cable.

FIG. 1b) shows the control system from the data-flow view. The logical data flow 24 takes place from the SDI objects or input modules 12 via the secure logic modules 17 of the decentralized, secure network subscriber 16 to the SDO objects or output modules 14.

FIG. 1c) shows the control system from the device view. In the device view, the safety islands 1, 2 and the safety small controller 18 are presented to the user in the so-called engineering tool (the network is not visible there). In the example, the safety island 1 represents a secure machine controller with an emergency-off function for a machine, and the safety island 2 represents the monitoring of a cabin door.

Figure 2:
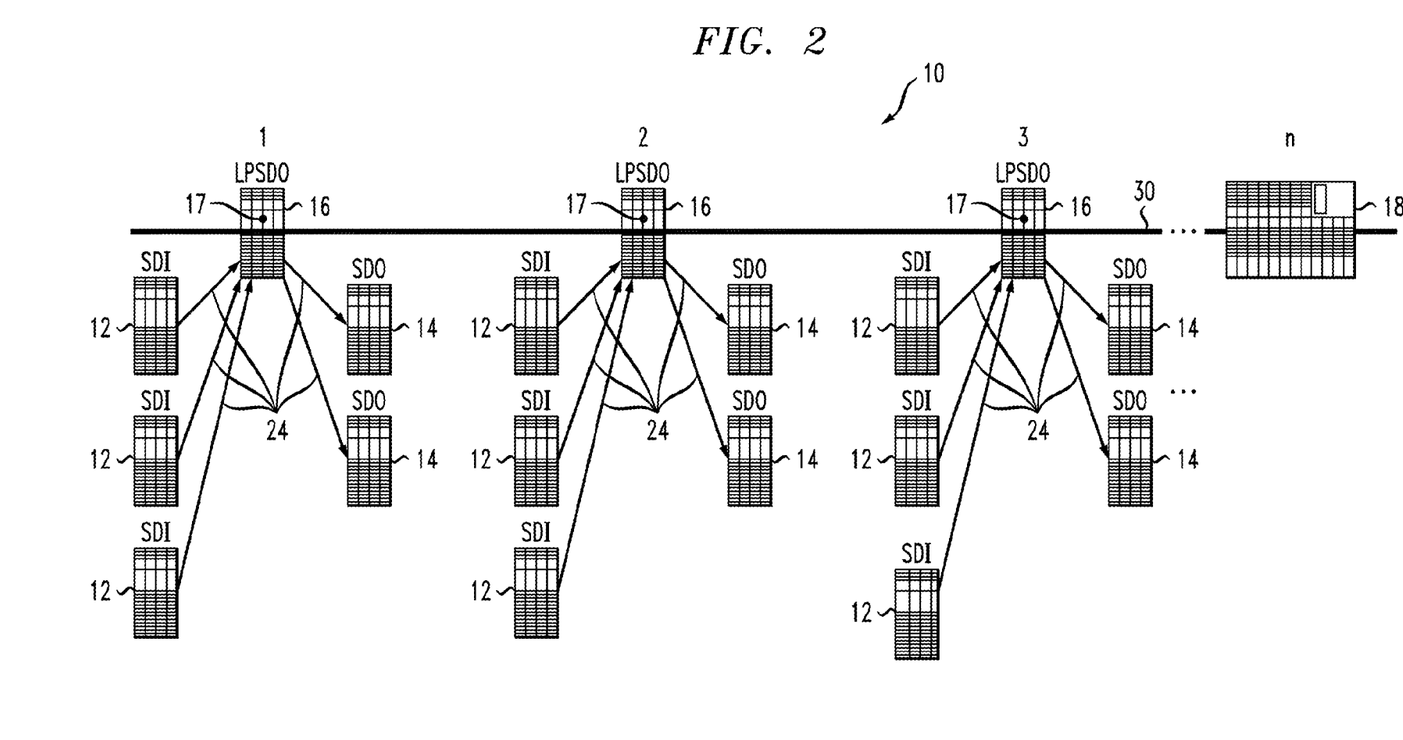

FIG. 2 relates to the data-flow view of another control system 10 with a plurality of decentralized, secure network subscribers 16 or safety islands 1, 2, 3, . . . j and a safety small controller 18 that represents the n-th network subscriber. The safety islands 1-3 are shown explicitly and the points indicate additional network subscribers or safety islands. According to the invention, the secure, decentralized network subscribers 16 or the safety islands 1-3, as well as the safety small controller, are bus subscribers. Each safety island comprises a decentralized, secure network subscriber LPSDO 16 with which multiple SDI and/or SDO objects 12, 14 can be linked logically as satellites. The decentralized, secure network subscribers 16 are linked in series by means of the software busbar 30 in order to execute the island-covering or system-wide safety functions (cf. FIGS. 4 and 5).

Figure 3:
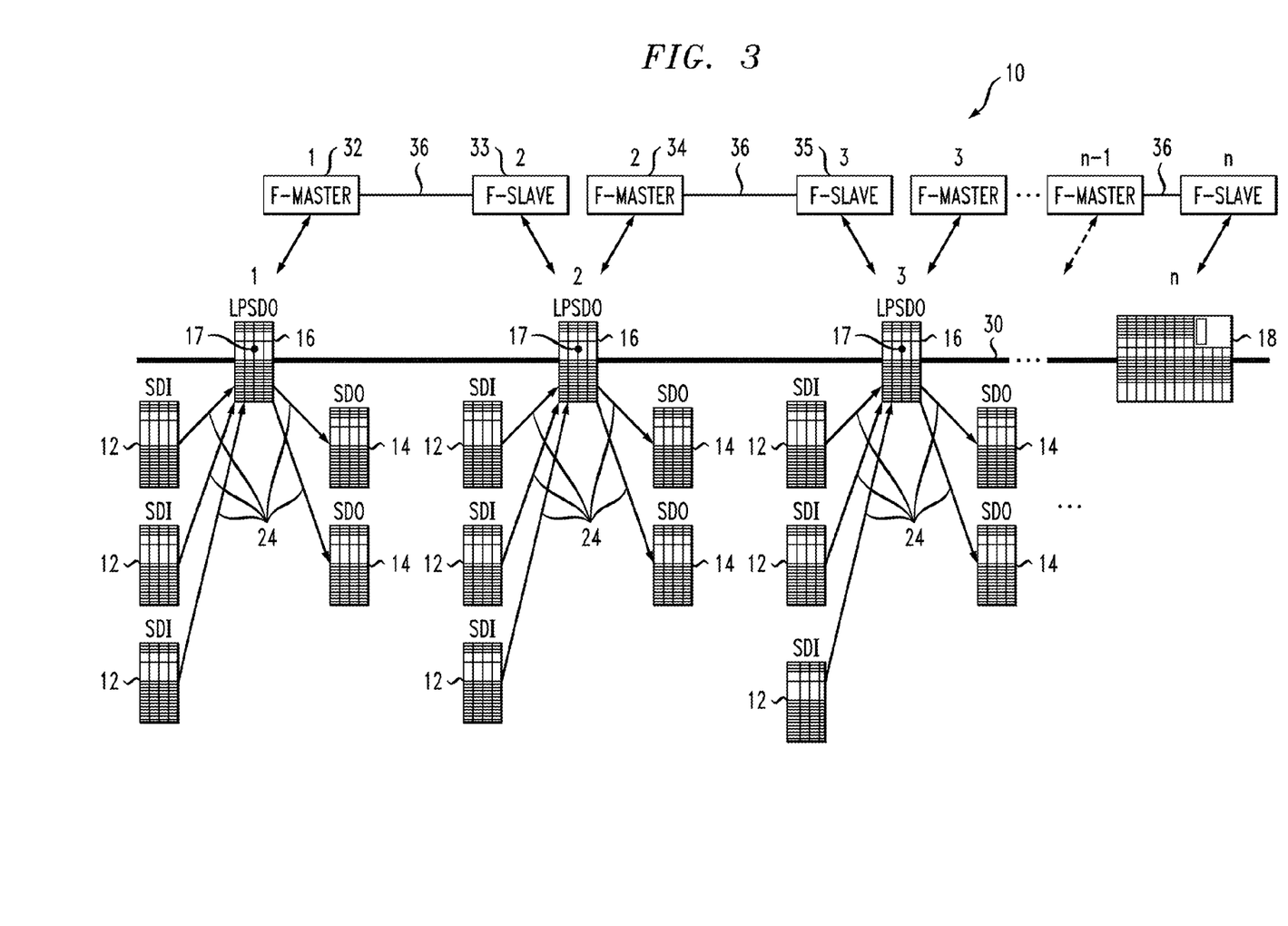

With reference to FIG. 3, the decentralized, secure network subscriber 16 of the safety island 1 forms a master 32 for the secure communications (so-called F-master) with the decentralized, secure network subscriber 16 of the following safety island 2 that functions, in this respect, as slave 33 (so-called F-slave). The decentralized, secure network subscriber 16 of the safety island 2 forms, in turn, the master 34 for the secure communications (F-master) with the decentralized, secure network subscriber 16 of the following safety island 3 that acts in this respect as a slave 35 (F-slave), etc.

For this purpose, each decentralized, secure network subscriber 16 has a unique safety address, the so-called F-address. This is used for the automatic establishment of the linking within the point-to-point relationships 36 between the decentralized, secure network subscribers 16 as corresponding source and target addresses.

With reference to FIG. 4, it shows the internal structure of a decentralized, secure network subscriber LPSDO 16 that is connected to the software busbar 30. As an example, only one line 38 of the software busbar 30 is shown. However, multiple "software lines" 38 could also be provided, for example, a separate software line 38 for each safety island. Furthermore, input-side and output-side safety communications layers FHss (F-Host busbar) and PSTss (PROFI safe device driver busbar) are shown, respectively.

Figure 4A:
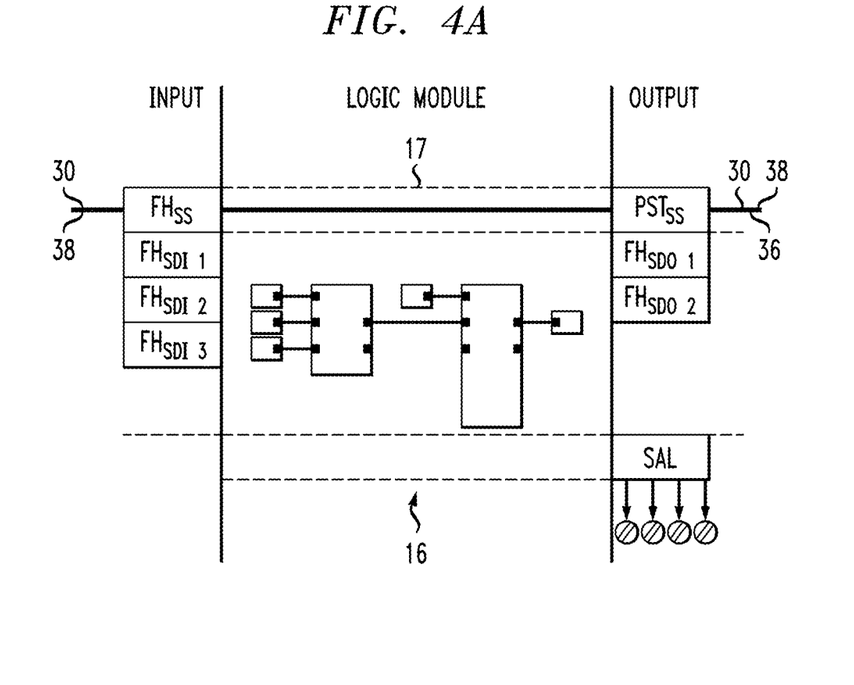
Figure 4B:
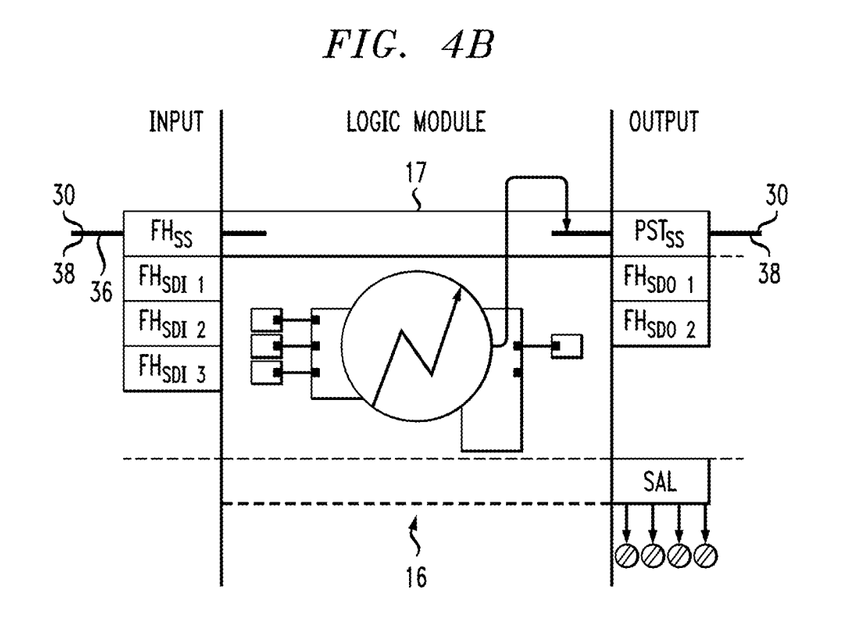

With reference to FIG. 4a), a logic module 17 is shown with currently no safety requirement, while in FIG. 4b) a safety requirement is placed on the logic module 17. The safety-relevant data, such as, e.g., an emergency-off command, is then successively transmitted from the secure logic module 17, via the chain of point-to-point relationships 36, to the subsequent secure logic modules of the subsequent decentralized, secure network subscriber 16, when a safety-relevant error case covering the system occurs. This safety-relevant data can then be evaluated automatically by the subsequent secure logic module 17 that is likewise connected to the software busbar 30 and could likewise possibly result in a disconnection there. This successive transmission of the safety-relevant data could be interpreted as "pulling" on a line of the software busbar in the error case. This triggers the disconnection in the other decentralized, secure network subscribers 16, wherein the responsibility for the evaluation of the safety-relevant data transmitted via the point-to-point relationships to the subsequent decentralized, secure network subscribers 16 lies in the respective, secure logic module 17.

Figure 5:
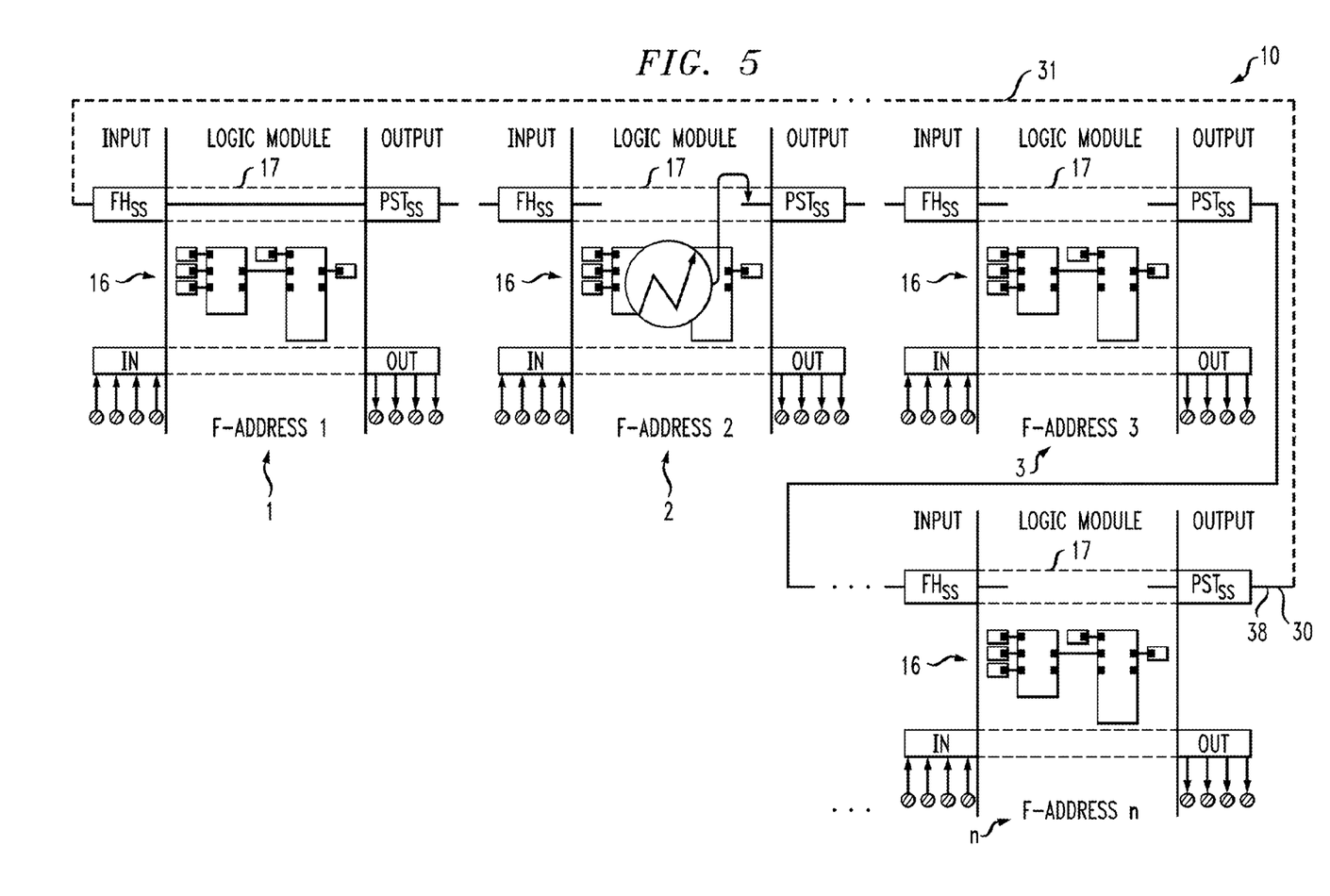

With reference to FIG. 5, a control system 10 is shown with n decentralized, secure network subscribers 16 connected to the software busbar 30 with the safety addresses (F-addresses) 1, 2, 3 . . . n.

In the secure logic module 17 of the network subscriber with the F-address 2, an error or a safety requirement is detected. This logic module 17 carries out the island-covering or system-wide safety function and to some extent "pulls" on the line 38 of the software busbar 30, in order to also transmit the safety requirement to the other decentralized, secure network subscribers 16. Such a "pulling" on the line is carried out in software or the logic module 17 of each decentralized, secure network subscriber 16. The incoming signal of the decentralized, secure predecessor network subscriber is logical-AND linked, e.g., with the status of the separate safety island. As soon as a safety requirement is detected, the outgoing signal to the decentralized, secure follower network subscriber is pulled to 0 in a defined way.

In other words, the logic modules 17 are linked on the software busbar 30 and are linked with each other in series automatically by the ascending F-addresses. The software busbar 30 could be closed in a ring shape by a loop 31.

The control system 10 according to the invention for controlling safety-critical processes thus concerns the fact that, instead of a central safety controller, decentralized, secure logic modules 17 themselves execute the safety functions and logic operations relevant for them. The secure logic modules 17 of the decentralized, secure network subscribers 16 are linked automatically and without a higher-level, central safety controller in the communications master 22 or separate central, secure control devices connected to the bus 20 with the help of a logical software busbar 30 with defined data width. For system-wide safety functions, these decentralized, secure logic modules 17 can communicate with each other in a fail-safe way. On one hand, the decentralized, secure network subscribers 16 monitor the fail-safe communications within the safety islands 1, 2, 3, etc., and, on the other hand, execute the fail-safe communications with their respective follower of the subsequent safety island 1→2, 2→3, etc. In the unsecured communications master 22 as a part of the so-called black channel, the standard telegrams are routed between the decentralized, secure logic modules accordingly. For example, the application program realizes this in the form of special copy commands or copy modules. These are configured and/or parameterized according to the bus configuration and addressing of the decentralized network or bus subscriber. The routing, however, could also be realized in the communications master 22, e.g. by processing a routing table.

In the sense of the invention, this configuration and/or parameterization expense can be significantly reduced in that the application program itself or an underlying routing layer evaluates the means (information) contained in the fail-safe communications protocols and automatically routes the telegrams from a source to the corresponding target address. The sequence of this linked list can be generated automatically, e.g., with reference to the set safety address of the modules. For this purpose, the safety address can be set, e.g., by means of DIP switches or by means of software in the corresponding secure logic modules 17 of the decentralized, secure network subscribers 16. For example, the unsecured communications master 22 could generate, as already discussed above, a routing table that is automatically loaded into the network subscribers. The linking structure or topology could also change dynamically, e.g., for network changes.

The linking structure of the secure logic modules of the decentralized, secure network subscriber 16 or the topology of the communication network 20 is then generated, in particular, exclusively based on the set safety addresses of the logic modules of the decentralized, secure network subscribers 16.

According to one special construction of the invention, the linking structure or topology of the communications network 20 is dependent on the automatic linking algorithm being used. Here, e.g., a ring-shaped network is also possible.

An example application for the control system is the automatic control of high-bay storage areas.

It is clear to someone skilled in the art that the previously described embodiments are to be understood as examples and the invention is not limited to these embodiments, but instead can be varied in many ways without going outside the scope of the invention. Furthermore, it is clear that the features are independent of whether they are disclosed in the description, the claims, the figures, or in some other way, also defining individual essential components of the invention, even if they are described in common together with other features.

What is claimed is:

1. A control system (10) for controlling safety-critical processes in an automated system by means of a communications network (20) with:

an unsecured communications master (22) for controlling the communications on the network (20); and a plurality of network subscribers (12, 14, 16, 18), wherein at least three of the network subscribers are configured as decentralized, secure network subscribers (16) and each has a separate, decentralized safety controller (17) for controlling a safety-relevant application, each of the decentralized, secure network subscribers (16) has a unique safety address, each of the decentralized, secure network subscribers (16) executes safety functions or safety logic operations relevant for said subscriber (16), the secure network subscribers (16) are grouped into at least three safety islands (1, 2, 3), and a logical point-to-point communication (36) via a data line on the network (20) between the decentralized, secure network subscribers (16) is configured as a fail-safe point-to-point communication (36) based on a chain of point-to-point relationships (36) from one safety island to another safety island, wherein a decentralized, secure network subscriber (16) of a first safety island (1) in a point-to-point relationship forms a master (32) and a decentralized, secure network subscriber (16) of a safety island (2) that follows the first safety island in the chain forms a slave (33), the master-slave relationships between safety islands (1, 2, 3) forming the chain of point-to-point relationships, so that decentralized, secure network subscribers (16) are pairwise individually connected with each other, thus providing each other safety functions.

2. The control system (10) according to claim 1, wherein the decentralized, secure network subscribers (16) are interlinked with allocated safety data input objects or safety data output objects (12, 14), each of which lacks a separate, decentralized safety controller for controlling a safety-relevant application, so that the decentralized, secure network subscribers (16) are grouped with the allocated safety data input objects or the safety data output objects (12, 14) into the safety islands (1, 2, 3), wherein each safety island comprises at least one decentralized, secure network subscriber (16).

3. The control system (10) according to claim 2, wherein the decentralized, secure network subscribers (16) have means for fail-safe cross communications within the safety islands (1, 2, 3).

4. The control system (10) according to claim 2, wherein island-covering safety functions are provided in which the decentralized, secure network subscribers (16) of the safety islands (1, 2, 3) communicate with each other in an island-covering, fail-safe way by means of the fail-safe point-to-point communications (36).

5. The control system (10) according to claim 1, wherein system-wide, fail-safe communications are automatically established between the decentralized, secure network subscribers (16) by means of the fail-safe point-to-point communications (36).

6. The control system (10) according to claim 1, wherein, by means of a data flow automatically established by the fail-safe, point-to-point communications (36) between the decentralized, secure network subscribers, a software busbar (30) is formed as a replacement for a hardware connection.

7. The control system (10) according to claim 6, wherein each safety island (1, 2, 3) is fixed to exactly one data line (38) of the software busbar (30).

8. The control system (10) according to claim 1, wherein a secure communications protocol is used for the fail-safe point-to-point communications (36) between the decentralized, secure network subscribers (16).

9. The control system (10) according to claim 8, wherein
i) data contained in the secure communications protocol is evaluated by an application program or an underlying routing layer, and
ii) telegrams of the underlying routing layer are routed from a source to a corresponding target address.

10. The control system (10) according to claim 1, wherein the safety address can be fixed by means of a switch or by means of software in the decentralized, secure network subscriber (16).

11. The control system (10) according to claim 1, wherein standard telegrams between the decentralized secure network subscribers (16) are routed in the unsecured communications master (22).

12. The control system (10) according to claim 11, wherein an application program executes the routing of the standard telegrams by executing copy commands that are configured or parameterized as a function of the addressing of the decentralized, secure network subscribers (16).

13. The control system (10) according to claim 11, wherein the unsecured communications master (22) generates a routing table and automatically routes the telegrams from a source to a target address with reference to a routing table.

14. The control system (10) according to claim 1, wherein telegrams controlled by the unsecured communications master (22) between the network subscribers have an identical data width for all point-to-point connections between the decentralized, secure network subscribers (16).

* * * * *